(12) United States Patent
Ochiai (10) Patent No.: US 10,058,081 B2
(45) Date of Patent: Aug. 28, 2018

(54) FISHING REEL

(71) Applicant: Shimano Inc., Sakai, Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/655,475

(22) Filed: Jul. 20, 2017

(65) Prior Publication Data

US 2018/0110209 A1   Apr. 26, 2018

(30) Foreign Application Priority Data

Oct. 20, 2016   (JP) .................................. 2016-205641

(51) Int. Cl.
| | | |
|---|---|---|
| *A01K 89/01* | (2006.01) | |
| *A01K 89/00* | (2006.01) | |
| *A01K 89/015* | (2006.01) | |

(52) U.S. Cl.
CPC .... *A01K 89/011221* (2015.05); *A01K 89/006* (2013.01); *A01K 89/0114* (2013.01); *A01K 89/01085* (2015.05); *A01K 89/0192* (2015.05); *A01K 89/01121* (2015.05); *A01K 89/01127* (2015.05); *A01K 89/01928* (2015.05)

(58) Field of Classification Search
CPC .............. A01K 89/01; A01K 89/01121; A01K 89/011221; A01K 89/01123; A01K 89/01928
See application file for complete search history.

(56) References Cited

U.S. PATENT DOCUMENTS

| | | | | |
|---|---|---|---|---|
| 6,176,446 | B1 * | 1/2001 | Sato ....................... | A01K 89/01 242/282 |
| 2002/0096587 | A1 * | 7/2002 | Ikuta ....................... | A01K 89/00 242/319 |
| 2009/0236456 | A1 | 9/2009 | Lee | |
| 2013/0327870 | A1 * | 12/2013 | Hiraoka .................. | A01K 89/01 242/234 |
| 2014/0191071 | A1 * | 7/2014 | Hiraoka .................. | A01K 89/01 242/311 |
| 2015/0157000 | A1 * | 6/2015 | Hiraoka .................. | A01K 89/01 242/234 |

FOREIGN PATENT DOCUMENTS

| | | |
|---|---|---|
| EP | 0 860 112 A1 | 8/1998 |
| JP | 2002-10728 A | 1/2002 |
| JP | 2009-106233 A | 5/2009 |
| JP | 2014-131491 A | 7/2014 |

OTHER PUBLICATIONS

European Search Report of corresponding EP Patent Application No. 17 18 6772.4 dated Mar. 26, 2018.

* cited by examiner

*Primary Examiner* — Emmanuel M Marcelo
(74) *Attorney, Agent, or Firm* — Global IP Counselors, LLP (57) ABSTRACT

A fishing reel includes a handle, a spool on which a fishing line is wound, a partially open reel body housing an internal mechanism converting a rotational force applied to the handle into a movement to wind the fishing line onto the spool, a lid member closing the opening of the reel body, and a seal member disposed between an opening edge portion of the reel body and a lid flat surface of the lid member. The seal member includes a shape-retaining portion that holds the shape and a sealing material that has elasticity.

9 Claims, 6 Drawing Sheets

FISHING REEL

CROSS-REFERENCE TO RELATED APPLICATIONS

This application claims priority to Japanese Patent Application No. 2016-205641, filed on Oct. 20, 2016. The entire disclosure of Japanese Patent Application No. 2016-205641 is hereby incorporated herein by reference.

BACKGROUND

Field of the Invention

The present invention relates to a fishing reel.

Description of the Related Art

A fishing reel is a reel for winding a fishing line that has been released (cast). The fishing line is wound on a spool by turning a handle attached to the reel. For example, in a spinning reel, a rotor is rotated by turning the handle, and a bail arm attached to the rotor guides the fishing line to be wound onto the spool. Further, a bait reel rotates the spool by turning the handle to wind the fishing line.

In a spinning reel, a rotor drive mechanism for rotating a rotor by turning the handle, and an oscillating mechanism for driving the spool back and forward, are receipted inside a reel body. The reel body has a side surface that is open in order to assemble the power transmission mechanisms therein. The opening is closed by a lid member after assembling the power transmission mechanisms inside the reel body.

In use, a fishing reel is generally exposed to fresh water or salt water. Accordingly, the space between the opening of the reel body and the lid member is subjected to a waterproof treatment so that water will not intrude to the power transmission mechanisms inside the reel body. Waterproofing is carried out by, for example, disposing a sealing plate between abutting surfaces of an opening edge portion of the reel body and the lid member, and screwing the lid member to the reel body (for example refer to Japanese Laid-Open Patent Publication No. 2014-131491).

When waterproofing by disposing a sealing plate between abutting surfaces of an opening edge portion of the reel body and the lid member, an annular ring-shaped rubber seal material is used as the sealing plate. The opening of the reel body is wide in order to assemble the power transmission mechanisms, and since the opening is provided in a reel body that matches the shape of the power transmission mechanism to be housed therein, the opening has a complex three-dimensional shape. Since it is necessary to seal such an opening around the entire perimeter, a thick rubber seal is used as the seal material, in order to provide some rigidity. Further, a seal groove for disposing such a rubber seal therein is provided in the opening edge portion of the reel body.

However, since it is necessary to provide a large seal groove in which a thick rubber seal can be disposed in the opening edge portion, the sizes of the reel body and the reel are accordingly increased. Further, since a rubber seal is flexible and tends to become twisted when placing in the seal groove, the work to accurately place the rubber seal into the seal groove is complicated. If the rubber seal is misaligned in the seal groove, the waterproof performance is insufficient, creating a defective product, and there is the risk that the yield will be decreased.

SUMMARY

The present invention was made in order to solve the problem described above, and an object thereof is to provide a fishing reel in which the seal between the reel body and the lid member can be reduced in size, and with which the attachment work is easy.

The fishing reel according to the present invention comprises a handle, a spool on which a fishing line is wound, a reel body, a lid member and a seal member. The reel body receipts an internal mechanism that converts a rotational force applied to the handle into a movement to wind the fishing line onto the spool. The lid member closes the opening of the reel body. The seal member is disposed between an abutting surface of the reel body and an abutting surface of the lid member, and includes a shape-retaining portion that holds a shape and a sealing material that has elasticity.

The abutting surfaces can have a three-dimensional shape, and the seal member can have a shape that corresponds to the three-dimensional shapes of the abutting surfaces.

At least one of the reel body and the lid member comprises a locking portion, and the seal member may comprise an engagement portion for positioning that engages the locking portion.

The shape-retaining portion can have a rigidity with which the shape of the seal member is retained in a static state.

The shape-retaining portion comprises a first surface that faces the reel body and a second surface that faces the lid member, and the sealing material can comprise a first sealing material disposed on the first surface and a second sealing material disposed on the second surface.

The cross-section of the shape-retaining portion, taken orthogonal to the longitudinal direction, can be substantially rectangular; and the first surface and the second surface may be substantially parallel.

The seal member can be disposed in a groove in the reel body or the lid member.

The sealing material can be adhered to the shape-retaining portion so as to continuously cover at least a portion of the shape-retaining portion around the entire perimeter in the longitudinal direction.

The shape-retaining portion can be made of metal, synthetic resin, or composite reinforced resin, and the sealing material can be made of an elastomeric material.

According to the present invention, it is possible to provide a fishing reel in which the seal between the reel body and the lid member can be reduced in size, and with which the attachment work becomes easy.

DETAILED DESCRIPTION OF THE INVENTION

First Embodiment

The spinning reel 10 for fishing according to the first embodiment of the present invention will be described, with reference to the drawings. While the present invention can be applied to fishing reels in general, the spinning reel 10 will be described as an example in the first embodiment.

Figure 1:
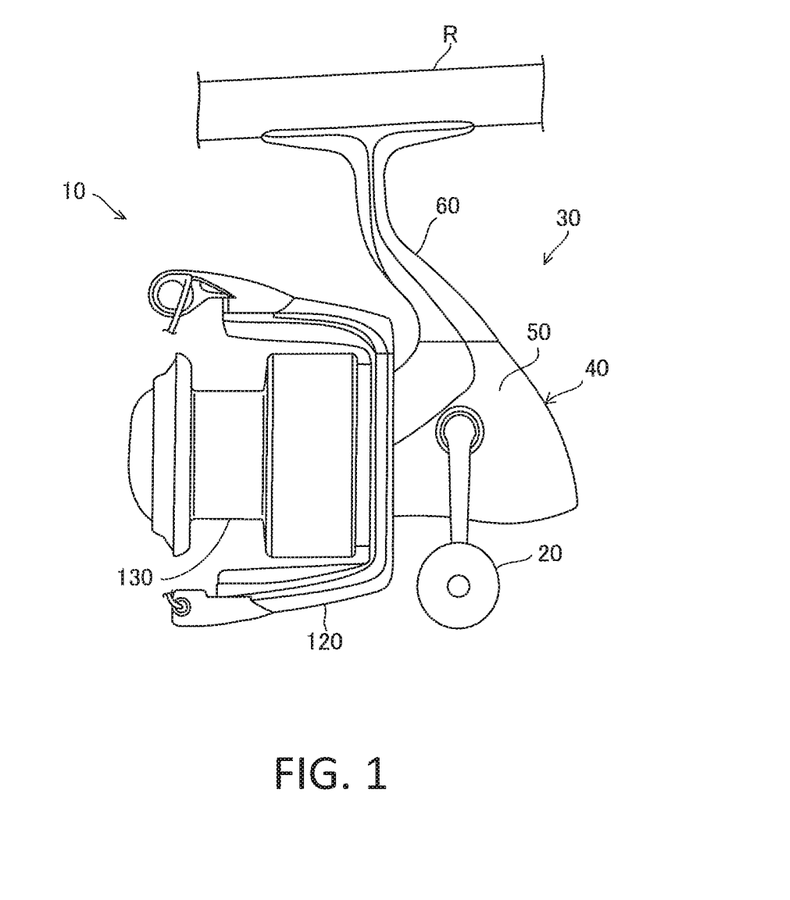
FIG. 1 is a side view of a spinning reel according to a first embodiment of the present invention.

As shown in FIG. 1, the spinning reel 10 is attached to a fishing rod R. The spinning reel 10 is a reel for winding a fishing line onto a spool 130 disposed on the distal end portion thereof, comprising a reel body (housing) 30 with a handle 20, a rotor 120 rotatably supported on the front of the reel body 30, and a spool 130 disposed on the front portion of the rotor 120 onto which the fishing line is wound.

Figure 2:
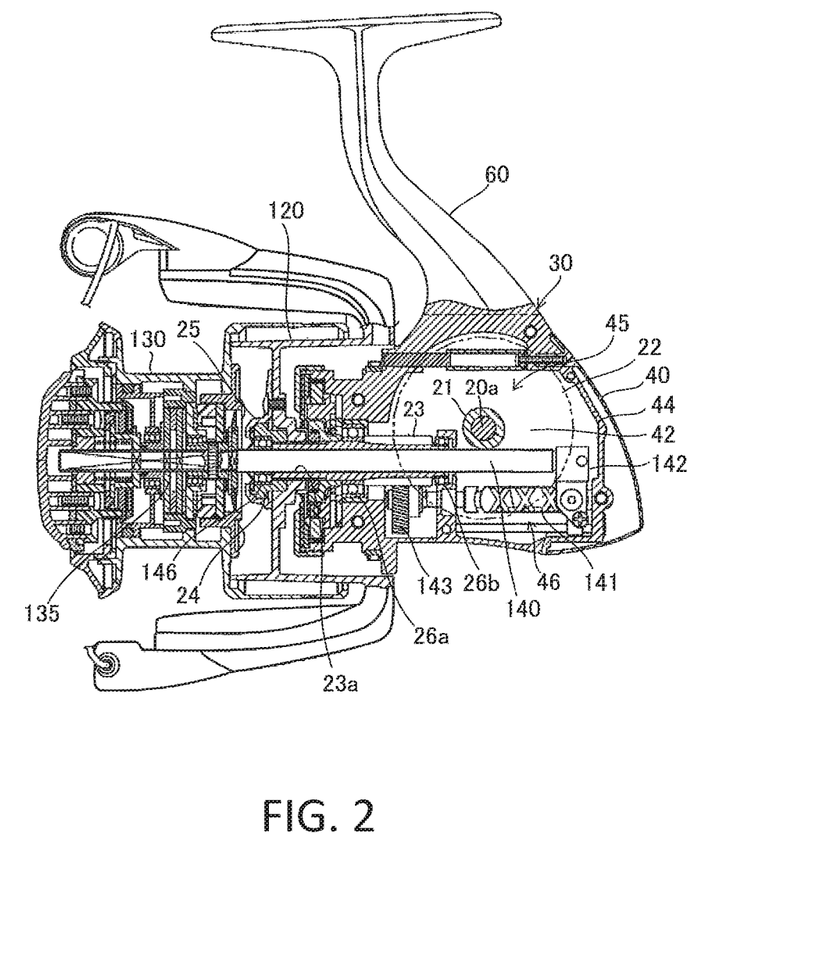
FIG. 2 is a cross-sectional side view showing the internal mechanism of the spinning reel shown in FIG. 1.

As shown in FIG. 1, the reel body 30 comprises a reel body 40, a lid member 50, and a rod attachment leg 60. As shown in FIG. 2, a rotor drive mechanism 45 that rotates the rotor 120 by turning the handle 20, and an oscillating mechanism 46 that reciprocates the spool 130 back and forward, are disposed inside the reel body 40 (mechanism installation space 42).

The rotor drive mechanism 45 comprises a driveshaft 21 to which is connected a handle shaft 20a of the handle 20, a drive gear 22 that is rotated together with the drive shaft 21, and a pinion gear 23 that meshes with the drive gear 22. The driveshaft 21 is, for example, a tubular shaft made of stainless steel alloy. The drive shaft 21 is supported on both ends by axle bearings (not shown) mounted on the reel body 40 and the lid member 50. A female threaded portion (not shown) for attaching the handle shaft 20a is formed on the inner surfaces of the two ends of the drive shaft 21.

The pinion gear 23 is a tubular member made of stainless alloy, for example, and the front portion 23a thereof extends through the center of the rotor 120. The pinion gear 23 is integrally and rotatably fixed to the rotor 120 by a nut 24. The nut 24 is fixed to the rotor 120 by a retainer 25 so as to not become loose. The intermediate portion and the rear end portion of the pinion gear 23 in the axial direction are rotatably supported in the reel body 40 by axle bearings 26a, 26b, which are attached to the reel body 40 with a space therebetween.

The oscillating mechanism 46 is a mechanism for moving a spool shaft 140, coupled to the center part of the spool 130 via a drag mechanism 135, in the longitudinal direction so as to reciprocate the spool 130 in the same direction. The oscillating mechanism 46 comprises a worm shaft 141 disposed in parallel below the spool shaft 140, a slider 142 moved in the longitudinal direction along the worm shaft 141, and an intermediate gear 143 fixed to the distal end of the worm shaft 141. The worm shaft 141 is disposed in the longitudinal direction, and is rotatably supported on the reel body 40. The proximal end of the spool shaft 140 is non-rotatably coupled to the slider 142. The slider 142 is guided in the longitudinal direction by two guide shafts (not shown) that are arranged in the reel body 40 along the longitudinal direction. The intermediate gear 143 meshes with the pinion gear 23.

The spool shaft 140 extends through the center portion of the pinion gear 23 and is reciprocated back and forward inside the pinion gear 23 by the oscillating mechanism 46. The spool shaft 140 is supported rotatably and movably in the axial direction, at the center portion by an axle bearing 146 mounted in the nut 24, and at the rear portion by the inner surface of the rear portion of the pinion gear 23.

The spool 130 is a member on which the fishing line is wound. The spool shaft 130 is supported on the distal end portion of the spool shaft 140 of the oscillating mechanism 46. The spool 130 is integrally reciprocated with the spool shaft 140 in the longitudinal direction in synchronization with the rotation of the rotor 120.

The rotor 120 is a member for winding the fishing line onto the spool 130. The rotor 120 is fixed to the front portion of the pinion gear 23 of the oscillating mechanism 46, and is integrally rotated with the pinion gear 170 by manually turning the handle 20.

Figure 3:
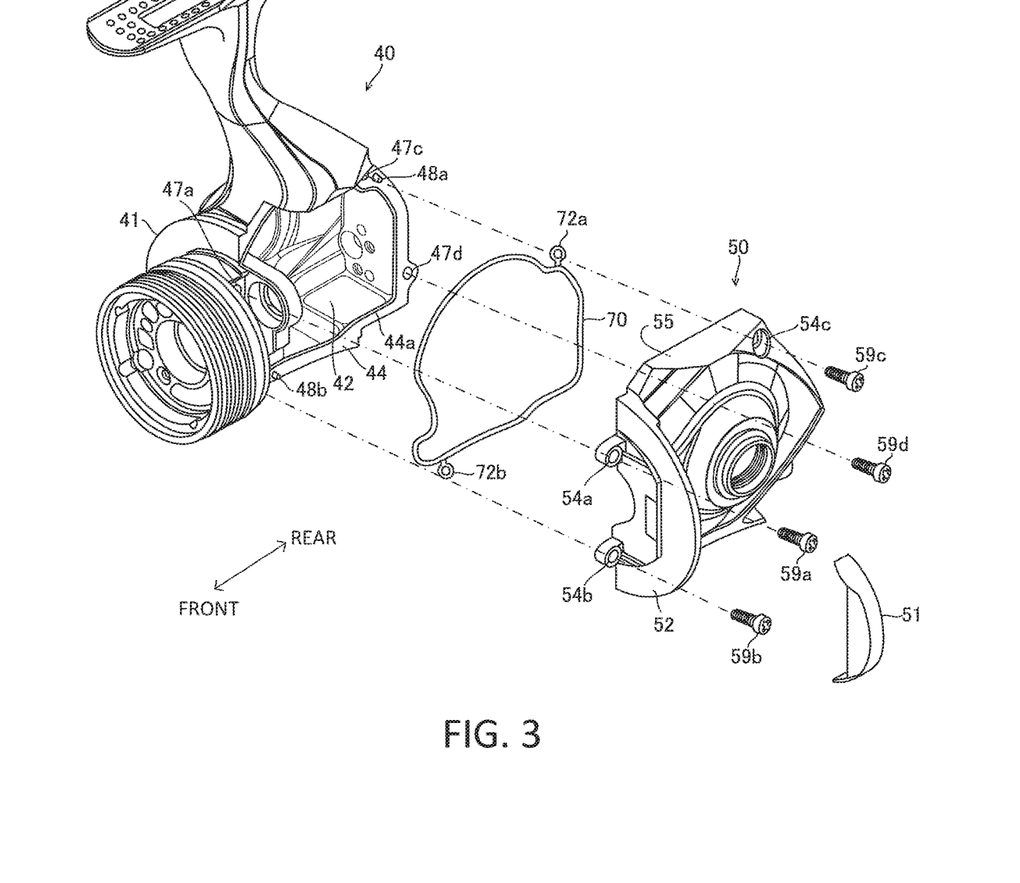
FIG. 3 is an exploded perspective view showing the unassembled state of the reel body, the seal member, and the lid member of the spinning reel shown in FIG. 1.

The reel body 40 is made of, for example, aluminum alloy or magnesium alloy. As shown in FIG. 3, a mechanism installation space 42 is disposed inside the reel body 40. As described above, the rotor drive mechanism 45 and the oscillating mechanism 46 are disposed in the mechanism installation space 42, but these mechanisms are omitted in FIG. 3. The side surface direction of the mechanism installation space 42 is open and has a three-dimensional shape so as to dispose these mechanisms. A flat opening edge portion (abutting surface) extends around the perimeter of the opening. The opening edge portion 44 is the portion that abuts the lid member 50 described later. Two locking pins (locking portion) 48a, 48b are disposed on the opening edge portion 44. A stepped portion (groove portion) 44a, having a rectangular shaped cross-section, is formed around the entire perimeter of the opening edge portion 44, at the innermost side thereof (the inner side, that is, the portion that faces the opening). Meanwhile, the stepped portion 44a is not necessarily at the inner side, and may be disposed in any position in the opening edge portion 44.

A semicircular first flange 41 is formed in front of the mechanism installation space 42 of the reel body 40. In addition, screw holes 47a, 47b (screw hole 47b is in a position that cannot be seen in FIG. 3) for attaching the lid member 50 are disposed in front of the reel body 40. Screw holes 47c, 47d for attaching the lid member 50 are disposed in the rear of the reel body 40.

The opening of the mechanism installation space 42 is closed by the lid member 50. The lid member 50 is made of, for example, aluminum alloy or magnesium alloy. A seal member 70 is disposed between the lid member 50 and the reel body 40. Details of the seal member 70 will be described later.

A semicircular second flange 52, which forms a circular flange portion together with the first flange 41 of the reel body 40, is disposed in the front portion of the lid member 50. Two screw insertion holes 54a, 54b are vertically spaced apart in front of the second flange 52. Screws 59a, 59b are respectively inserted into the screw insertion holes 54a, 54b, and are respectively screwed into the screw holes 47a, 47b in the front portion of the reel body 40. The screw insertion holes 54a, 54b, and the two screws 59a, 59b, are covered by a cover member 51.

Screw insertion holes 54c, 54d, into which the screws 59c, 59d can respectively be inserted, are formed in the rear portion of the lid member 50 (screw insertion hole 54d is in a position not visible in FIG. 3). The screws 59c, 59d extend through the screw insertion holes 54c, 54d, and are respectively screwed into screw holes 47c, 47d in the rear portion of the reel body 40. The lid member 50 is fixed to the reel body 40 by the four screws 59a, 59b, 59c, 59d.

A lid flat surface (abutting surface) 55 is formed on the side of the lid member 50 that faces the opening of the reel body 40, in a position that corresponds to the opening edge portion 44. As described above, an endless (annular) seal member 70 is disposed between the opening edge portion 44 and the lid flat surface 55. More specifically, the seal member 70 is disposed between the stepped portion 44a of the opening edge portion 44 and the lid flat surface 55. The space between the reel body 40 and the lid member 50 is thereby sealed. Stepped portion 44a prevents a gap from forming between the lid member 50 and the reel body 40 when the lid member 50 is assembled to the reel body 40. While the lid flat surface 55 has a sufficiently wide width to abut against the opening edge portion 44 of the seal member 70, it is not necessary to provide a groove for receiving the seal member 70.

Figure 4A:
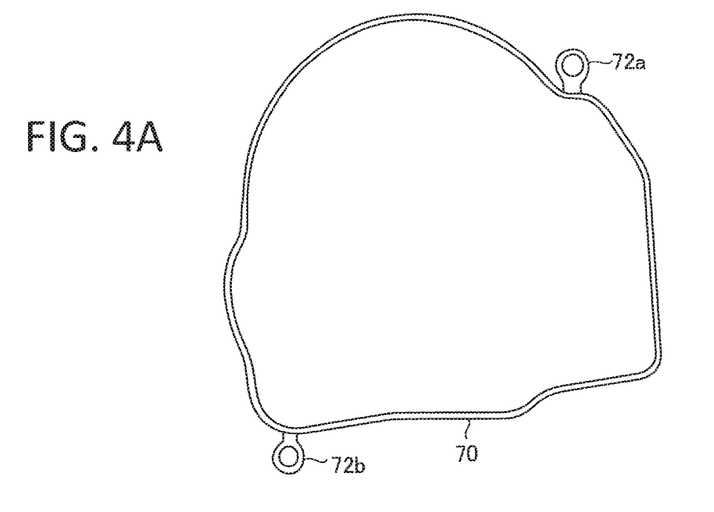
FIG. 4A is an overall view of the seal member.

As shown in FIG. 4A, the seal member 70 is a three-dimensional, continuous endless (annular) seal member that is shaped to match the shape of the opening of the reel body 40, that is, the shape of the opening edge portion 44. The seal member 70 comprises engagement rings (engagement portion for positioning) 72a, 72b at two locations. The engagement rings 72a, 72b are disposed in positions corresponding to the locking pins 48a, 48b disposed on the opening edge portion 44. The seal member 70 is accurately disposed in the stepped portion 44a by externally fitting the engagement rings 72a, 72b on the locking pins 48a, 48b. In the first embodiment, two pairs, the engagement ring 72a and locking pin 48a, and the engagement ring 72b and locking pin 48b, of an engagement ring/locking pin pair for positioning are provided, but there may be only one pair. However, if the opening is large, it is preferable in terms of positioning to have two or more pairs.

Figure 4B:
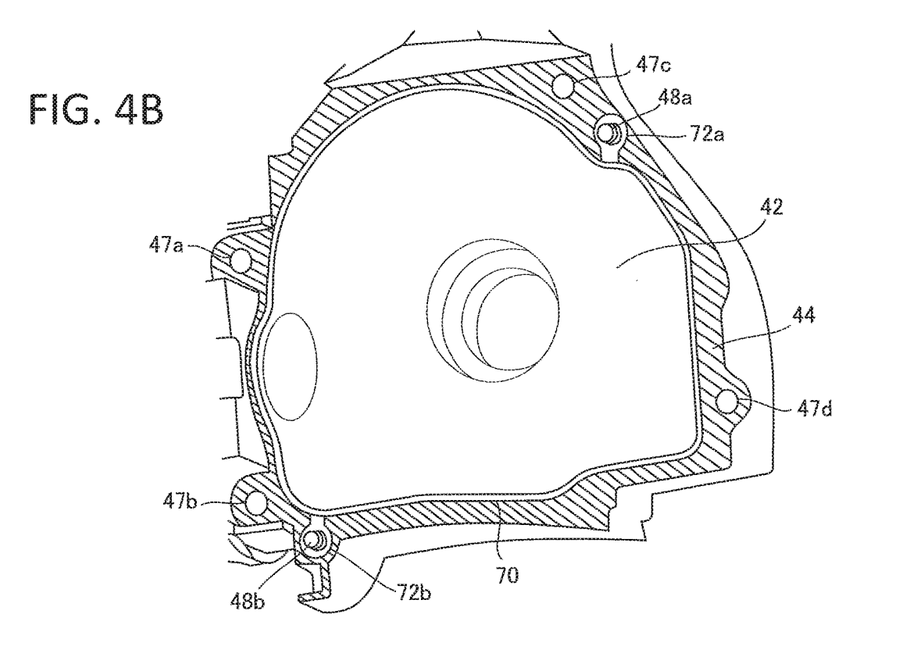
FIG. 4B is a perspective view of the seal member attached to the opening edge portion of the reel body, shown in FIG. 3, as viewed from the lid member side.

As shown in FIG. 4B, the seal member 70 is positioned and disposed in the stepped portion 44a, by externally fitting the engagement rings 72a, 72b to the locking pins 48a, 48b disposed on the opening edge portion 44. In FIG. B4B, the opening edge portion 44 is cross-hatched forth sake of clarity. Further, the mechanism inside the mechanism installation space 42 is not shown, in order to avoid complication. Meanwhile, since the stepped portion 44a is below the seal member 70, the stepped portion is not visible in FIG. B4B.

Figure 5A:
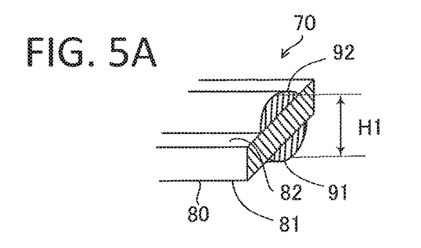
FIG. 5A is a cross-sectional view of the seal member shown in FIG. 3.

As shown in FIG. 5A, the seal member 70 is formed from an endless shape-retaining portion 80 made of metal or resin, and a sealing material 90, which is an elastomeric material, formed on the surface of the shape-retaining member 80. The thickness of the seal member 70 is H1.

The cross-section that is orthogonal to the longitudinal direction of the shape-retaining portion 80 is formed in a rectangular, or substantially rectangular shape around the entire perimeter. A first surface 81 of the shape-retaining portion 80 is a surface which faces the reel body 40, and a second surface 82 is a surface which faces the lid member 50. The first surface 81 and the second surface 82 are parallel, or substantially parallel.

The shape-retaining portion 80 has a rigidity of a degree with which the three-dimensional shape of the seal member 70 corresponding to the open edge portion 44 can be substantially maintained in a static state (when left standing). "Substantially maintain the three-dimensional shape" means that the shape will be deformed, but will not collapse, due to its own weight without support, and that the three-dimensional shape corresponding to the opening edge portion 44 can be easily recovered by being supported by hand.

As shown in FIG. 4A, the shape-retaining portion 80 comprises two engagement rings 72a, 72b, each of which has a hole. The engagement rings 72a, 72b may be attached by welding, adhesion, etc., after forming the annular shape-retaining portion 80, or may be integrally formed with the annular shape-retaining member 80.

In terms of metal materials, the material of the shape-retaining portion 80 may be any material that can be processed to be thin, and that has a certain degree of rigidity, such as stainless steel, aluminum (alloy), nickel (alloy), and titanium (alloy). Examples of resin materials that can be used include thermosetting resins, such as phenol resin, epoxy resin, and urea resin; and thermoplastic resins such as PVC (polyvinyl chloride), ABS (acrylonitrile butadiene styrene) resin, and acrylic resin. In addition, a composite reinforced resin in which various reinforcing materials are combined with resin may be used as well.

The sealing material 90 is adhered to the shape-retaining portion 80 so as to continuously cover at least a portion of the shape-retaining portion around the entire perimeter in the longitudinal direction. Specifically, as shown in FIG. 5A, the sealing material 90 comprises a first sealing material 91 and a second sealing material 92. The first sealing material 91 is adhered on the first surface 81 of the shape-retaining portion 80 in a semicircular or substantially semicircular shape, around the entire perimeter in the longitudinal direction. A semicircular shape is formed in order to increase the sealing function, by forming the abutting portion of the sealing material 90 into a convex curved surface, that is, by forming such that the width is narrower toward an abutting side, so that the contact area is gradually wider when compressed at the time of contact. The first surface 81 is a surface that faces the reel body 40, when the seal member 70 is disposed in the stepped portion 44a. Therefore, the first sealing material 91 comes into contact with the stepped portion 44a of the reel body 40.

The second sealing material 92 is adhered on the second surface 82 of the shape-retaining portion 80 in a semicircular or substantially semicircular shape, around the entire perimeter in the longitudinal direction. The reason for forming a semicircular shape is as above described shape of the first sealing material 91. The second surface 82 is a surface that faces the lid member 50, when the seal member 70 is disposed in the stepped portion 44a. Therefore, the second sealing material 92 comes into contact with the lid flat surface 55 of the lid member 50, when covering the lid member 50 on the reel body 40.

Examples of materials that can be used for the sealing material 90 include rubber, such as natural or synthetic rubber, silicone rubber, and fluoric rubber; or styrene based, olefin based, vinyl chloride based, urethane based, and amide based thermoplastic elastomers. A thermoplastic elastomer can be used when manufacturing the seal member 70 by insert molding.

The first sealing material 91 and the second sealing material 92 can be attached to the shape-retaining member 80 by, for example, insert molding. That is, molds that have the outer shapes of the first sealing material 91 and the second sealing material 92 are respectively prepared; the respective frames are attached to the two sides of the shape-retaining portion 80; and an elastomeric material, which is the material of the first sealing material 91 and the second sealing material 92, is heated and injected into the molds. In order to improve the adhesion between the shape-retaining portion 80 and the sealing material 90, it is possible to modify the surface of the shape-retaining portion 80, or to apply a primer. Further, an elastomeric material that has effective adhesiveness with the material of the shape-retaining portion 80 can be selected. In this manner, when carrying out insert molding, commonly used techniques may be appropriately employed.

Figure 6:
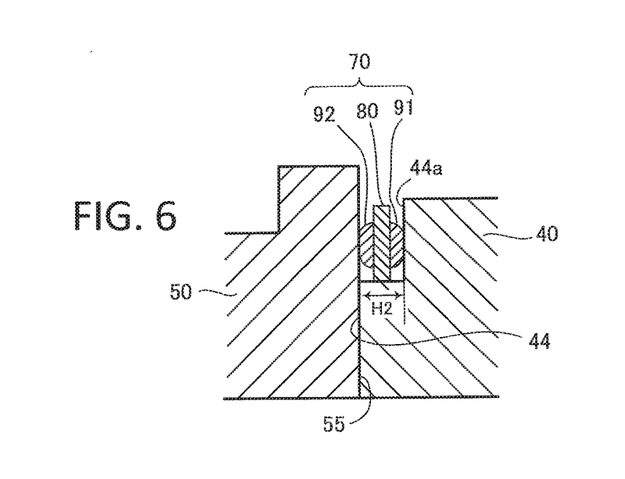
FIG. 6 is a partial, enlarged cross-sectional view of the sealing portion of the lid member fastened by attaching a seal member between the reel body and the lid member shown in FIG. 3.

As shown in FIG. 6, the seal member 70 is formed to have a width (the vertical direction length as viewed in FIG. 6) that substantially fits in the stepped portion 44a. The height H2 of the stepped portion 44a is smaller than the height H1 of the seal member 70. Accordingly, when the lid member 50 is placed on the reel body 40 and fastened by the four screws 59a-59d, the first sealing material 91 of the seal member 70 is pressed by the stepped portion 44a, and is elastically deformed to come in close contact with the stepped portion 44a. Further, the second sealing material 92 is pressed by the lid flat surface 55, and is elastically deformed to come in close contact with the lid flat surface 55. A watertight seal is thereby completed between the reel body 40 and the lid member 50.

The height H2 of the stepped portion 44a and the height H1 of the seal member 70 are adjusted such that, when the lid member 50 is tightened and the opening edge portion 44 and the lid flat surface 55 are put in close contact with each other, appropriate pressure is applied to the seal member 70, appropriately deforming the first sealing material 91 and the second sealing material 92, such that a sealing function is exerted. Since a stepped portion 44a is formed in the opening edge portion 44 and a seal member 70 is disposed in the stepped portion 44a, when viewed from the outside (in FIG. 6, the lower side is the outside and the upper side is the inside), no gap is created between the reel body 40 and the lid member 50, resulting in a good appearance.

When mounting the seal member 70 according to the first embodiment, first, the engagement rings 72a. 72b are externally fitted to the locking pins 48a, 48b of the reel body 40, respectively, to thereby perform the positioning, after which the position of the seal member 70 is finely adjusted manually so that the entirety thereof is fitted in the stepped portion 44a. Since the seal member 70 itself retains the shape, the positional adjustment at this time is easy.

In this manner, since the seal member 70 has a shape-retaining property due to the shape-retaining portion 80, the seal member is not twisted when being disposed in the stepped portion 44a of the reel body 40, and installation becomes easy. Furthermore, since the seal member 70 comprises engagement rings 72a, 72b, positioning is easy by externally fitting to the locking pins 48a, 48b of the reel body 40. Accordingly, installation is easier. This effect is particularly great when the opening is large, and has a complex shape. Further, positioning is further facilitated by providing a stepped portion 44a, which also improves the outer appearance.

Further, since the seal member 70 according to the first embodiment has a shape-retaining property (rigidity) by the shape-retaining portion 80 made of metal or resin, it is possible to reduce the size, compared to a conventional seal member, which is given a certain degree of rigidity by only a sealing material. Further, since the shape-retaining portion 80 is made of metal or resin, it is possible to provide sufficient rigidity thereto, even with a small size. Accordingly, since the width (or the radius) of the seal member 70 is small compared to when a seal member is formed by only a sealing material, it is possible to reduce the width of the position in which the seal member is disposed. Furthermore, since the positional displacement of the seal member 70 is small, it is possible to narrow the width (dimensional tolerance) of the opening edge portion 44 of the reel body 40, and to reduce the size of the reel body 40. Thus, it is possible to design a compact reel.

Second Embodiment

Figure 7A:
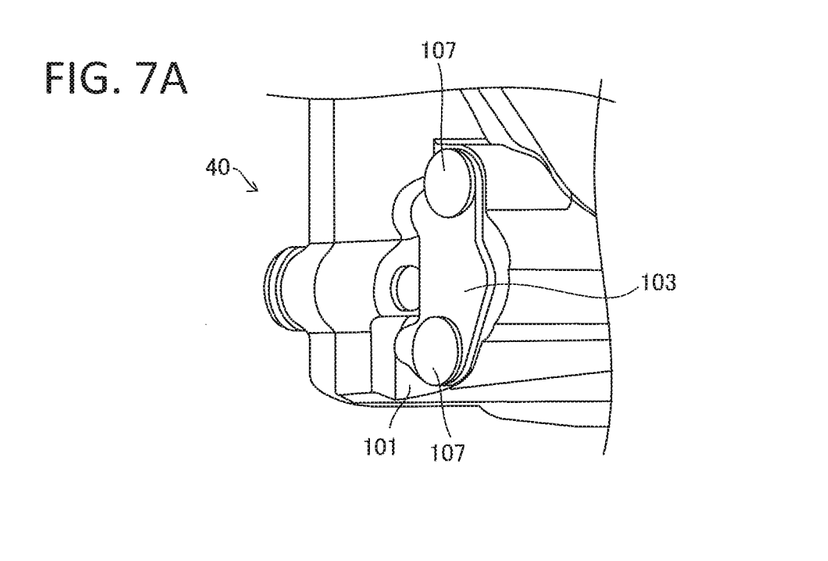
FIG. 7A is a perspective view of a stopper member in a state of being attached to the rear end portion of the reel body.

The second embodiment of the present invention is described with reference to FIG. 7A and FIG. 7B. A reel body rear end portion 101 of the reel body 40 is positioned immediately behind the worm shaft 141 of the oscillating mechanism 46 that is incorporated in the mechanism installation space 42 of the reel body 40. An opening, which is not shown, is disposed in the reel body rear end portion 101, on the axis of the worm shaft 141, and a stopper member 103 with an irregular thin plate shape is fixed to the reel body rear end portion 101 by two screws 107 so as to close the opening (refer to FIG. 7A).

Figure 7B:
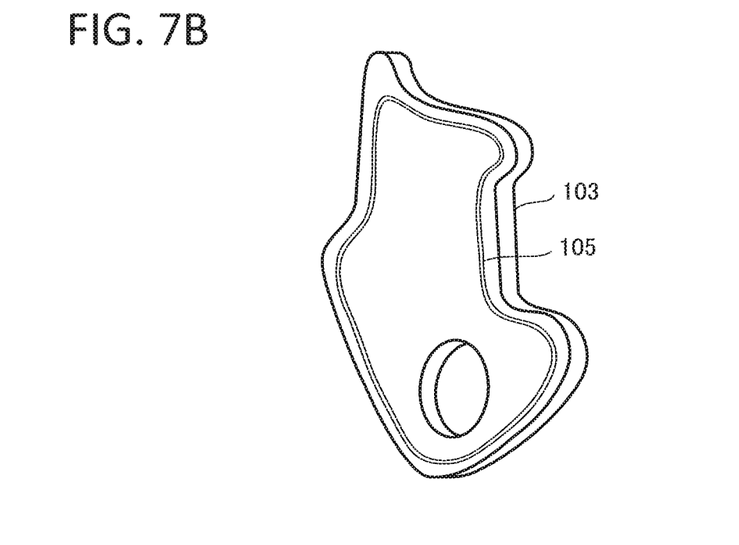
FIG. 7B is a perspective view of the stopper member.

As shown in FIG. 7B, a sealing material 105 is attached to the back surface of the stopper member 103 (the surface that abuts the reel body rear end portion 101), in a position surrounding the perimeter of the opening, or along the outer perimeter of the stopper member 103. The sealing material 105 is a waterproof seal for sealing the space between the reel body rear end portion 101 and the stopper member 103.

The stopper member 103 can be made of metal, such as stainless steel, and the sealing material 105 can be made of an elastomeric material. The materials described in the first embodiment can be used as the elastomeric material. The sealing material 105 is attached to the stopper member 103 in advance in a position around the opening by insert molding, for example. Accordingly, a sufficient waterproof effect can be obtained by simply attaching the stopper member 103, to which the sealing material 105 is attached, as is.

In a conventional method in which a separate sealing material is sandwiched and fastened between the reel body rear end portion 101 and the stopper member 103, if the position of the separate sealing material is displaced, due to twisting, or the like, sufficient waterproof performance cannot be obtained, creating a defective product, and there is the risk that the yield will be decreased. In contrast, by using the stopper member 103, in which the sealing material 105 is attached in advance to the position described above, it is possible to easily and reliably ensure a waterproof function by simply fastening with screws.

Modified Example

Figure 5B:
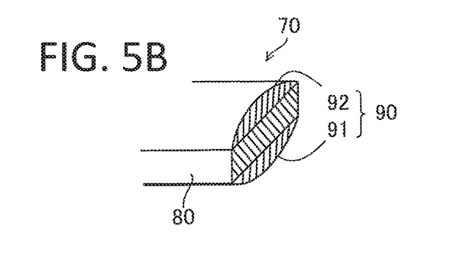
FIG. 5B is a cross-sectional view of another seal member.
Figure 5C:
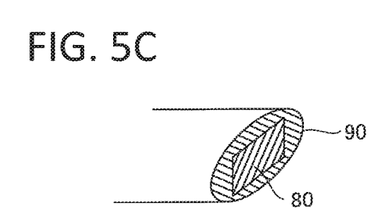
FIG. 5C is a cross-sectional view of another seal member.
Figure 5D:
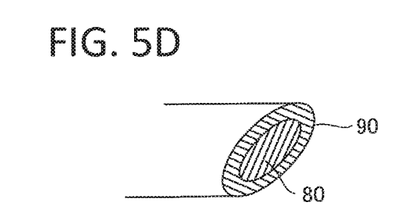
FIG. 5D is a cross-sectional view of another seal member.

In the first embodiment, the seal member 70 is configured such that the shape-retaining portion 80 is rectangular, and a semicircular first sealing material 91 and second sealing material 92 are respectively disposed on the first and second surfaces 81 and 82 thereof. The first sealing material 91 and the second sealing material 92 have shapes that cover only portions of each surface, but the shapes thereof are not limited. For example, as shown in FIG. 5B, the first and second sealing material 91 and 92 may be formed so as to respectively cover the entirety of the first and second surfaces 81 and 82. Alternatively, as shown in FIG. 5C, the sealing materials may be formed so as to cover the entire shape-retaining portion 80. Further, the shape of the shape-retaining portion 80 is not limited to a rectangular shape, and may be a polygonal shape or an irregular shape. Alternatively, as shown in FIG. 5D, the cross section of the shape-retaining portion 80 may be elliptical or circular. Any combination of the shape of the shape-retaining portion 80 and the shape of the sealing material 90 is possible.

In the first embodiment, insert molding is used as the manufacturing method of the seal member 70. However, any manufacturing method may be used, as long as the method is for attaching and forming an elastomeric material on a metal plate or a resin plate. For example, bonding using an adhesive may be employed, or a three-dimensional laminating method, such as a 3D printer, may be used as well.

In the first embodiment, the reel body 40 includes locking pins 48a. 48b, and the seal member 70 is disposed in the stepped portion 44a disposed to the reel body 40. However, locking pins 48a. 48b may be disposed on the lid flat surface 55 of the lid member 50, and a stepped portion (groove) 44a may be disposed to the lid flat surface 55, to thereby dispose the seal member 70 to the lid member 50. Further, of the two locking pins 48a, 48b, one locking pin 48a may be disposed on the reel body 40 and the other locking pin 48b may be disposed on the lid flat surface 55 of the lid member 50, to lock both the reel body 40 and the lid member 50.

In the first embodiment, the seal member 70 is disposed between the reel body 40 and a lid member 50 on the side surface of the reel body. However, the position to which the seal member 70 is disposed is not limited thereto. The seal member may be disposed between an opening and a lid member that covers the opening (not necessarily called a "lid member," and may be a different member that requires a seal in the connection portion thereof), at any position of the reel body 40. Additionally, the invention may be applied not only to a spinning reel, but to a portion of the reel body of a bait reel that requires a seal.

What is claimed is:

1. A fishing reel, comprising:
a handle;
a spool on which a fishing line is capable of being wound;
a reel body having an opening, and housing an internal mechanism configured to convert a rotational force applied to the handle into movement to wind the fishing line onto the spool;
a lid member configured to close the opening of the reel body; and
a seal member disposed between abutting surfaces of the reel body and the lid member, and including a shape-retaining portion configured to hold a shape and a sealing material having elasticity, the sealing material and the shape-retaining portion being formed from different materials.

2. The fishing reel recited in claim 1, wherein
the abutting surfaces have three-dimensional shapes, and the seal member has a shape that corresponds to the three-dimensional shapes of the abutting surfaces.

3. The fishing reel recited in claim 1, wherein
at least one of the reel body and the lid member comprises a locking portion, and
the seal member comprises an engagement portion for positioning configured to engage the locking portion.

4. The fishing reel recited in claim 1, wherein
the shape-retaining portion has a rigidity with which the shape of the seal member is capable of being retained in a static state.

5. The fishing reel recited in claim 1, wherein
the shape-retaining portion comprises a first surface facing the reel body and a second surface facing the lid member, and
the sealing material comprises a first sealing material disposed on the first surface and a second sealing material disposed on the second surface.

6. The fishing reel recited in claim 5, wherein
a cross-section of the shape-retaining portion orthogonal to a longitudinal direction is substantially rectangular, and the first and second surfaces are substantially parallel.

7. The fishing reel recited in claim 1, wherein
the seal member is disposed in a groove disposed in the abutting surface of the reel body or an abutting surface of the lid member.

8. A fishing reel, comprising:
a handle;
a spool on which a fishing line is capable of being wound;
a reel body having an opening, and housing an internal mechanism configured to convert a rotational force applied to the handle into movement to wind the fishing line onto the spool;
a lid member configured to close the opening of the reel body; and
a seal member disposed between abutting surfaces of the reel body and the lid member, and including a shape-retaining portion configured to hold a shape and a sealing material having elasticity,
the sealing material being adhered to the shape-retaining portion so as to continuously cover at least a portion of the shape-retaining portion around an entire perimeter in a longitudinal direction.

9. A fishing reel, comprising:
a handle;
a spool on which a fishing line is capable of being wound;
a reel body having an opening, and housing an internal mechanism configured to convert a rotational force applied to the handle into movement to wind the fishing line onto the spool;
a lid member configured to close the opening of the reel body; and
a seal member disposed between abutting surfaces of the reel body and the lid member, and including a shape-retaining portion configured to hold a shape and a sealing material having elasticity,
the shape-retaining portion being metal, synthetic resin, or composite reinforced resin, and the sealing material being an elastomeric material.

* * * * *